United States Patent
Voegel

(10) Patent No.: US 8,086,750 B2
(45) Date of Patent: Dec. 27, 2011

(54) METHOD AND SYSTEM FOR DELIVERING CONTENT OVER A NETWORK

(75) Inventor: Hans-Joerg Voegel, Groebenzell (DE)

(73) Assignee: Darby & Mohaine, L.L.C., Wilmington, DE (US)

( * ) Notice: Subject to any disclaimer, the term of this patent is extended or adjusted under 35 U.S.C. 154(b) by 1509 days.

(21) Appl. No.: 11/029,212

(22) Filed: Jan. 3, 2005

(65) Prior Publication Data

US 2005/0289145 A1    Dec. 29, 2005

Related U.S. Application Data

(63) Continuation of application No. 10/801,926, filed on Mar. 15, 2004, now abandoned, which is a continuation of application No. 10/464,804, filed on Jun. 17, 2003, now abandoned.

(60) Provisional application No. 60/390,029, filed on Jun. 17, 2002.

(51) Int. Cl.
    *G06F 15/16* (2006.01)
(52) U.S. Cl. .......................... 709/231; 709/226; 709/229
(58) Field of Classification Search .................. 709/208, 709/229, 231, 226
    See application file for complete search history.

(56) References Cited

U.S. PATENT DOCUMENTS

| | | | | |
|---|---|---|---|---|
| 6,654,807 B2 * | 11/2003 | Farber et al. | ................. | 709/225 |
| 6,725,272 B1 * | 4/2004 | Susai et al. | .................... | 709/229 |
| 6,865,605 B1 * | 3/2005 | Soderberg et al. | ............ | 709/226 |
| 7,305,479 B1 * | 12/2007 | Morris et al. | ................. | 709/229 |
| 7,454,485 B2 * | 11/2008 | Kukkal | ......................... | 709/223 |
| 2002/0078174 A1 * | 6/2002 | Sim et al. | ...................... | 709/219 |
| 2002/0083187 A1 * | 6/2002 | Sim et al. | ...................... | 709/235 |
| 2002/0198937 A1 * | 12/2002 | Diwan et al. | ................. | 709/203 |
| 2003/0005152 A1 * | 1/2003 | Diwan et al. | ................. | 709/239 |
| 2005/0102405 A1 * | 5/2005 | Siegel | ........................... | 709/227 |
| 2005/0198662 A1 * | 9/2005 | Endo et al. | ..................... | 725/31 |

OTHER PUBLICATIONS

U.S. Appl. No. 60/390,029, filed Jun. 17, 2002, Hans-Jeorg Voegel.
U.S. Appl. No. 10/464,804, filed Jun. 17, 2003, Hans-Jeorg Voegel.
U.S. Appl. No. 10/801,926, filed Mar. 15, 2004, Hans-Jeorg Voegel.

* cited by examiner

*Primary Examiner* — Mohamed Ibrahim
(74) *Attorney, Agent, or Firm* — Perkins Coie LLP

(57) ABSTRACT

Content stored in association with metadata is automatically redirected over coupled computer networks. A portal is configured to deliver the stored content to a plurality of distributed client machines via one or more designated network edge servers. The portal receives content requests from a particular client machine and utilizes the metadata to provide content portions to a first network edge server for delivery to the particular client machine. Modules such as software modules selectively provide either the first portion of the content or a further portion of the content to a second network edge server while automatically redirecting the particular client machine to the second network edge server in real-time. Redirection is performed in accordance with predetermined criteria which is preferably related to the performance of the network branch that includes the first network edge server.

20 Claims, 13 Drawing Sheets

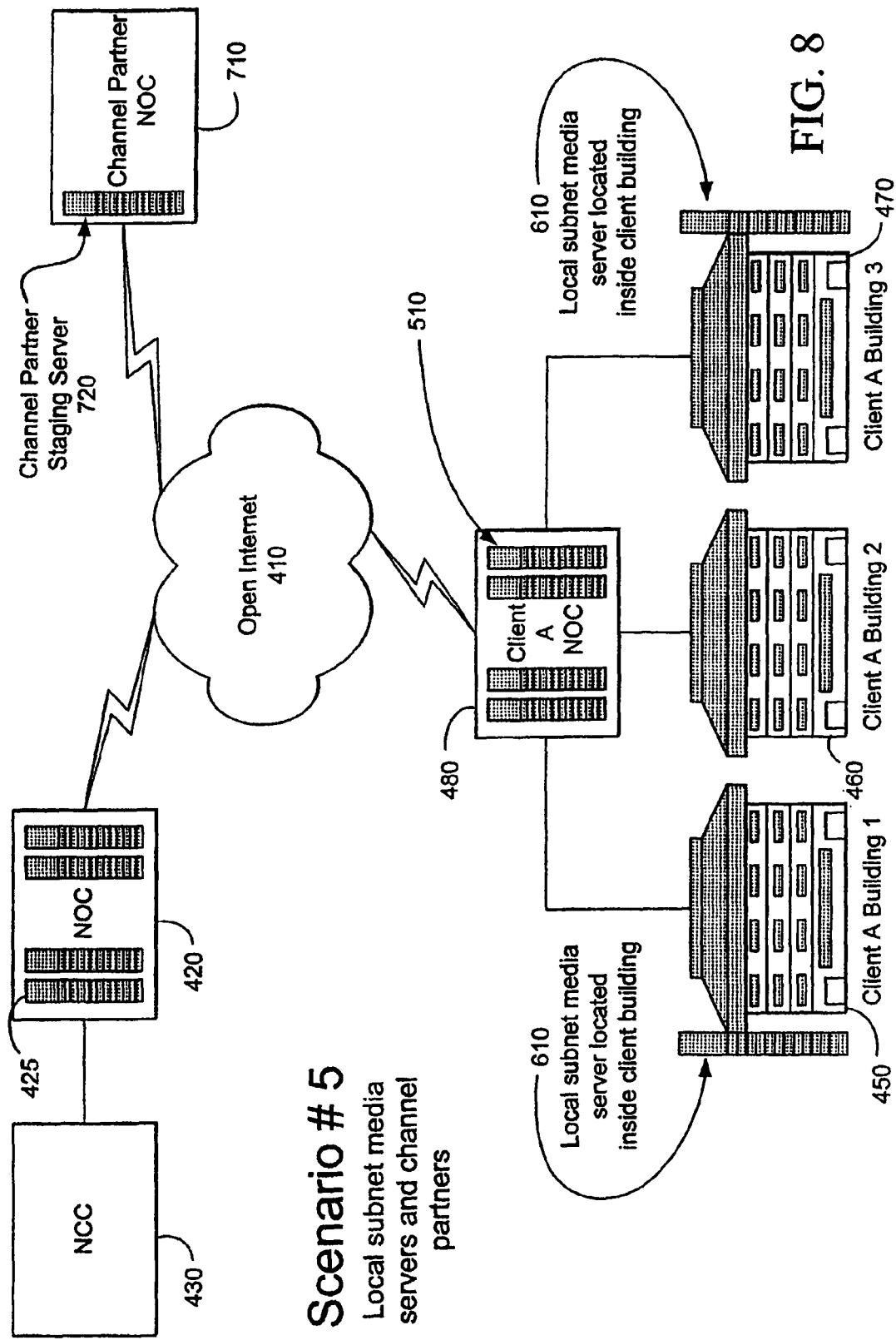

METHOD AND SYSTEM FOR DELIVERING CONTENT OVER A NETWORK

This application is a continuation of U.S. patent application Ser. No. 10/801,926, filed Mar. 15, 2004, now abandoned, which is a continuation of U.S. patent application Ser. No. 10/464,804, filed Jun. 17, 2003, now abandoned, which claims the benefit of priority under 35 U.S.C. §119(e) from U.S. Provisional Application Ser. No. 60/390,029, filed Jun. 17, 2002, entitled " Method and System for Delivering Content of Learning Sessions Over the Internet," the disclosure of which is hereby incorporated by reference as if set forth in its entirety herein.

BACKGROUND OF THE INVENTION

1. Field of the Invention

The present invention relates to providing streaming media data over coupled and heavily trafficked public/private computer networks. More particularly, the present invention relates to architectures for server deployment that reduce problems associated with the public network usage that otherwise impede efficient data subscription services to users.

2. Description of Related Art

The number of computers connected to the Internet has grown tremendously in recent years. A client/server description of the interactions between computers is well-known. A "client" computer connected to the Internet can download digital information from "server" computers. Client application software typically accepts commands from a user and obtains data and services by sending requests to server applications running on the server computers. A number of protocols may be used to exchange commands and data between computers connected to the Internet. For instance, protocols including the File Transfer Protocol (FTP), the Hyper Text Transfer Protocol (HTTP), the Simple Mail Transfer Protocol (SMTP), and the Gopher document protocol are commonly used.

Typically, the HTTP protocol is used to access data on the World Wide Web (the Web). The Web is an information service on the Internet providing documents and information, as well as links between documents and information. It is made up of numerous Web sites located around the world that maintain and distribute electronic documents. A Web site may use one or more Web server computers that store and distribute documents in a number of formats, including the Hyper Text Markup Language (HTML). An HTML document contains text and metadata (commands providing formatting information), as well as embedded links that reference other data or documents.

The referenced documents may represent text, graphics, video, streaming-media or any combination thereof.

A Web browser is a client application or, preferably, an integrated operating system utility that communicates with server computers via FTP, HTTP and Gopher protocols. Web browsers retrieve electronic documents from the network and present them to a user. Web browsers receive content from a server sent over the Internet that is typically encoded in Hyper Text Markup Language (HTML) and executed by the browser on a client computer. To remove limitations imposed by using only HTML scripts, browsers typically support the usage of additional components such as Java Applets, ActiveX Controls, and Plug-Ins that provide extra functionality. These additional components, commonly referred to as "client bits," are typically stored as executables in the memory of the client computer, and can be installed onto the client computer directly from a storage medium or downloaded from a server over the Internet. The functional components such as Java Applets, ActiveX Controls, and Plug-Ins are mapped into the script so that actions, methods, or properties of an object can be called therefrom. (ActiveX Controls are reusable software components that incorporate ActiveX technology, which enables software applications to interact with one another in a networked environment regardless of the language in which the components were created. ActiveX Controls can be embedded in Web pages to produce animation and other multimedia effects, interactive objects and sophisticated applications. ActiveX Controls can be written in a variety of programming languages, including C, C++, Visual Basic, and Java. A Plug-In, on the other hand, is a software component designed to plug into the Netscape Navigator browser, and to permit the browser to access and execute files embedded in HTML documents that are in formats the browser normally would not normally recognize.)

Web browsers typically contain an associated scripting space, which is memory space allocated for a browser instance, for the reception of electronic data called a script. Web browsers receive scripts from the network into the scripting space and execute instructions contained in the script. One such instruction contained in a script might be presenting data to a user, usually by way of an output device such as a computer monitor. In addition to data for presentation to a user, the script may also contain mappings to objects and services stored in the memory of a client computer and instructions for interaction with or communication to and from those objects and services. A script might also contain additional instructions as well. An exchange between script instructions in a scripting space and a service or an object can be facilitated by additional objects, such as a Plug-In or ActiveX control. In these cases, a mapping to the Plug-In or ActiveX control is contained in the script, and the Plug-In or ActiveX control performs some operation towards carrying out the script instruction.

Through such technology, the Web or Internet has become a major communication medium wherein large volumes of streaming media, such as video presentation, are provided to users on a daily basis. Streaming media is a rich and powerful means of information delivery, which has clear advantages in the business environment. The power of video, combined with the ubiquity of the Internet, offers businesses a robust new platform for communication and collaboration. In today's global economy, streaming enables businesses to gain competitive advantage.

To date, however, the transmission of video over the Internet has been plagued by the "watch and wait" phenomenon. Previous IP video technology required that viewers first download a segment in its entirety before playback could begin. As a result, currently available streaming media applications generally suffer from degradation in the quality of service (QoS) as applied to networked environments (e.g., Internet). The degradation in quality of service (QoS) is generally attributable to network congestion and data capacity limitations in communication links and conduits (e. g., connectivity), as well as other factors that generally affect quality of service (QoS). As a result, in current streaming media applications as applied to networked environments, the end user or client typically will experience degradation in the quality of the particular media application. Typical problems associated with such degraded media applications are a loss in sound quality, picture quality, or actual operation of the media application at the end user's interface that is attributable to transmission congestion. Therefore, as streaming media becomes a more widely employed and accepted communication medium, quality of service (QoS) considerations are becoming an increasingly important factor in providing streaming media applications. See PCT publication W001/41399 for a methodology that addresses streamed media in the context of a conventional networked environment.

With the growth of rich content, enterprises find themselves with a problem: the every-day use of rich content applications develop an enormous demand for bandwidth, often saturating corporate backbone networks and adversely impacting mission-critical applications. Thus, there remains a need for methods to address quality of service (QoS) concerns of streaming media applications within private corporate network environments, especially to enterprise content delivery networks (eCDN) and multi-tiered eCDNs.

SUMMARY OF THE INVENTION

This invention provides methods for delivering streaming data to subscribing clients with high quality of service. The methodologies reduce problems associated with network usage that otherwise impede efficient data subscription services through the use of metadata for content replication and intelligent, automated distribution.

In accordance with one aspect of the invention, content stored in association with metadata is automatically redirected over coupled computer networks. A portal is configured to deliver the stored content to a plurality of distributed client machines via one or more designated network edge servers. The portal receives one or more requests for one or more content portions from a particular client machine and utilizes the metadata to provide such content portions to a first network edge server for delivery to the particular client machine. The method selectively provides either the same portions of the content that have been delivered to the first network edge server or further portions of the content to a second network edge server while automatically redirecting the particular client machine to the second network edge server in real-time.

Redirection can be performed in accordance with predetermined criteria which is preferably related to the performance of the network branch that includes the first network edge server.

These and other features, aspects and advantages of the invention will be apparent from a review of the accompanying drawing figures and detailed description of several embodiments.

BRIEF DESCRIPTION OF THE FIGURES

FIG. 8 illustrates an embodiment serving via local sub-net media servers and channel partners.

DETAILED DESCRIPTION

Figure 1:
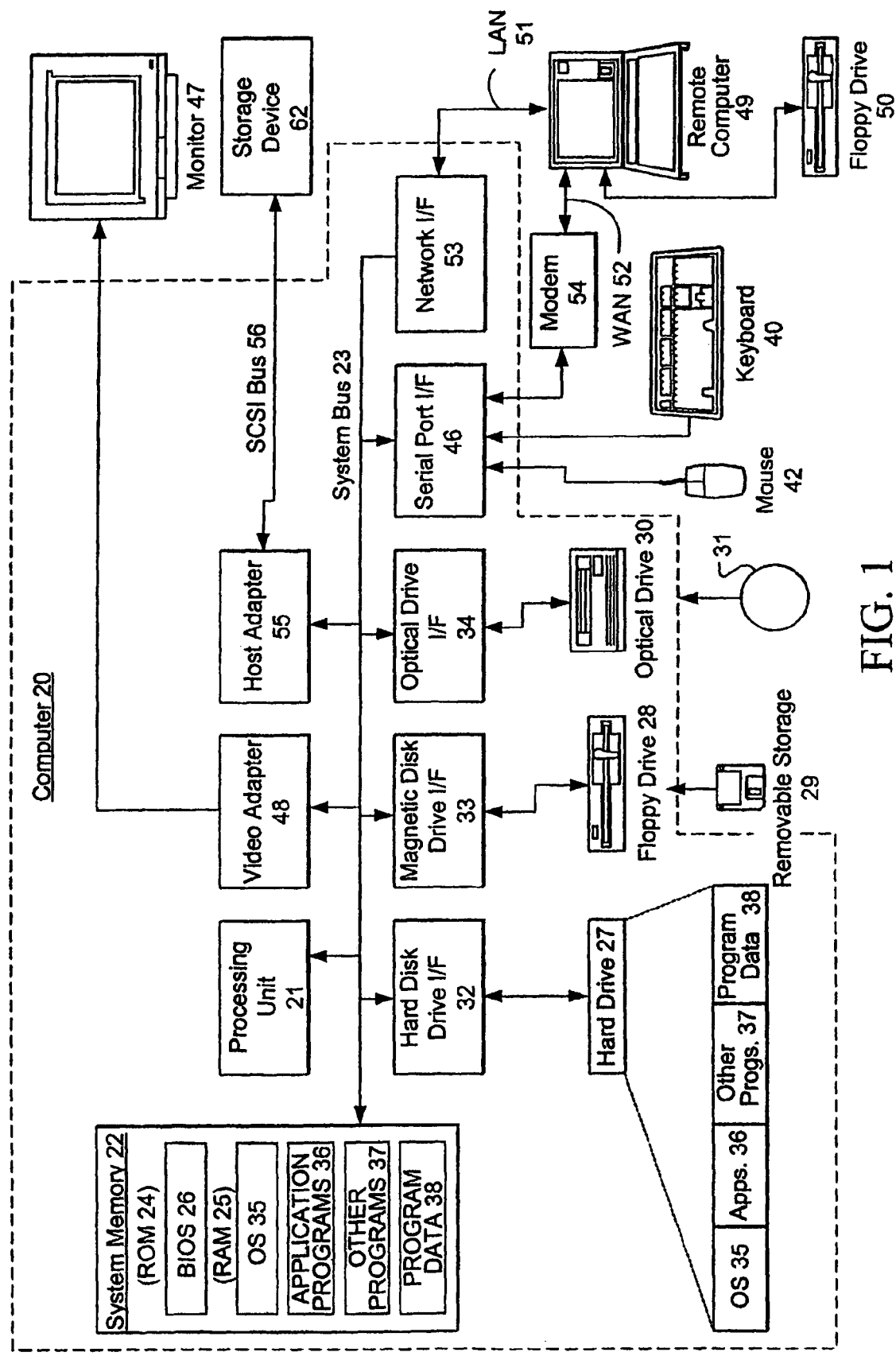
FIG. 1 illustrates a general overview of a computing environment.

FIG. 1 and the following description are intended to provide a general description of a suitable computing environment in which the invention may be implemented. Although not necessarily required, the invention will be described in the general context of computer-executable instructions, such as program modules, being executed by a computer, such as a client workstation or a server.

Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics including cellular telephones, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system may include a conventional personal computer 20 or the like, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 may include read-only memory (ROM) 24 and random access memory (RAM) 25. A basic input/output system 26 (BIOS), containing the basic routines that help to transfer information between elements within the personal computer 20, such as during start-up, may be stored in ROM 24. The personal computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 may be connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the personal computer 20. Although the exemplary embodiment described herein may employ a hard disk, a removable magnetic disk 29, and a removable optical disk 31, or combination therefor, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMS) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner, or the like. These and other input devices are often connected to the processing unit 21 through a serial port interface 46 that is coupled to the system bus 23, but may be connected by other interfaces, such as a parallel port, game port, or universal serial bus (USB). A monitor 47 or other type of display device may also be connected to the system bus 23 via an interface, such as a video adapter 48. In addition to the monitor 47, personal computers may typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used such as T-1, T-3, digital subscriber line (DSL), cable modem and other conventionally available hardware links.

Figure 2:
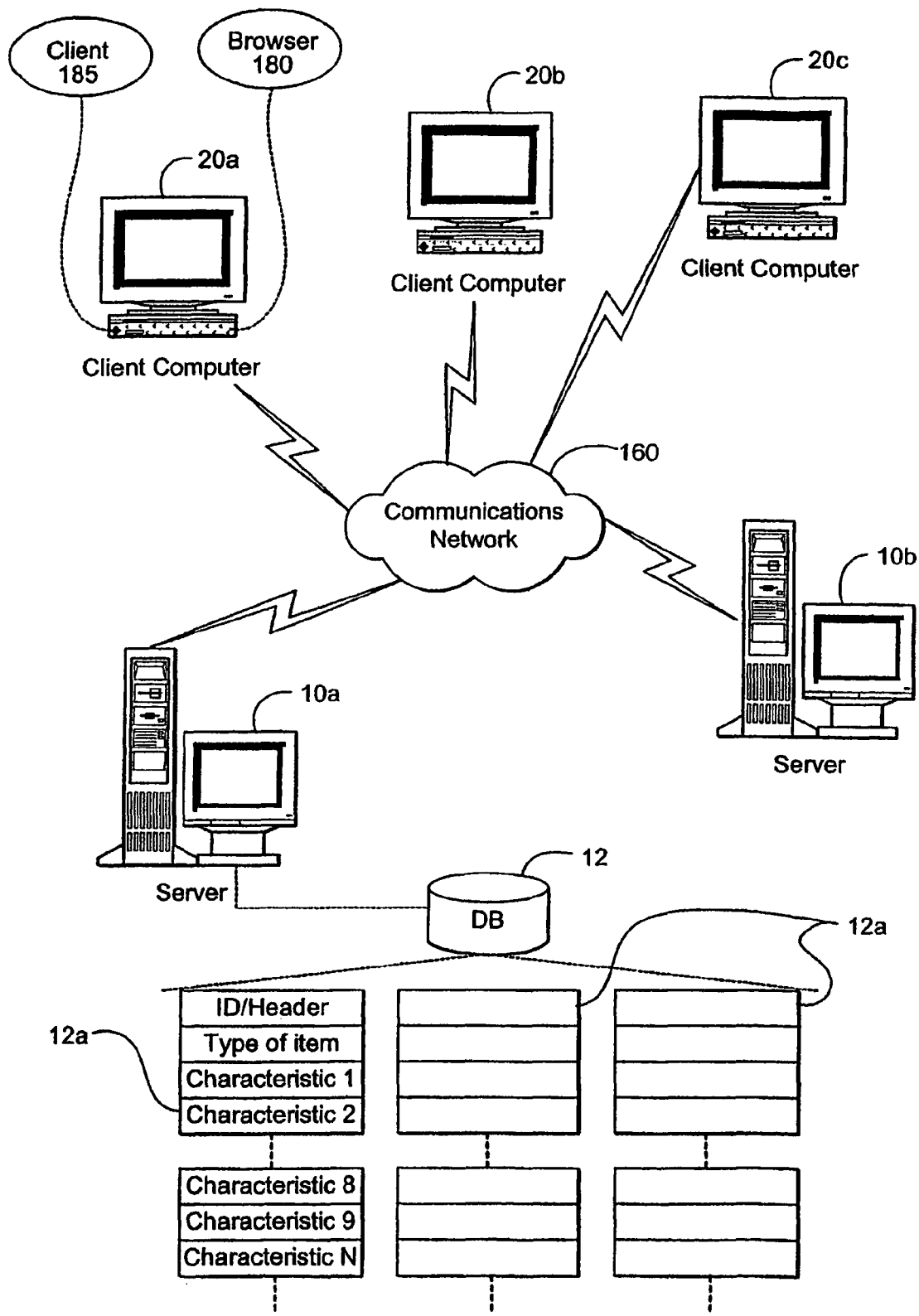
FIG. 2 illustrates an exemplary embodiment of a conventional network environment in which the invention can be deployed.

As noted, the computer described above can be deployed as part of a computer network. In general, the above description applies to both server computers and client computers deployed in a network environment. FIG. 2 illustrates one such exemplary network environment in which the present invention may be employed. As shown in FIG. 2, a number of servers 10a, 10b, etc., are interconnected via a communications network 160 (which may be a LAN, WAN, intranet or the Internet) with a number of client computers 20a, 20b, 20c, etc. In a network environment in which the communications network 160 is, e.g., the Internet, the servers 10 can be Web servers with which the clients 20 communicate via any of a number of known protocols such as, for instance, hypertext transfer protocol (HTTP). Each client computer 20 can be equipped with a browser 180 to gain access to the servers 10, and client application software 185. As shown in the embodiment of FIG. 2, server 10a includes or is coupled to a dynamic database 12.

As shown, the database 12 may include database fields 12a, which contain information about items stored in the database 12. For instance, the database fields 12a can be structured in the database in a variety of ways. The fields 12a could be structured using linked lists, multi-dimensional data arrays, hash tables, or the like. This is generally a design choice based on ease of implementation, amount of free memory, the characteristics of the data to be stored, whether the database is likely to be written to frequently or instead is likely to be mostly read from, and the like. A generic field 12a is depicted on the left side. As shown, a field generally has sub-fields that contain various types of information associated with the field, such as an ID or header sub-field, type of item sub-field, sub-fields containing characteristics, and so on. These database fields 12a are shown for illustrative purposes only, and as mentioned, the particular implementation of data storage in a database can vary widely according to preference.

Thus, the present invention can be utilized in a computer network environment having client computers for accessing and interacting with the network and a server computer for interacting with client computers and communicating with a database with stored inventory fields. Likewise, the streaming media process of the present invention can be implemented with a variety of network-based architectures, and thus should not be limited to the examples shown.

Figure 3:
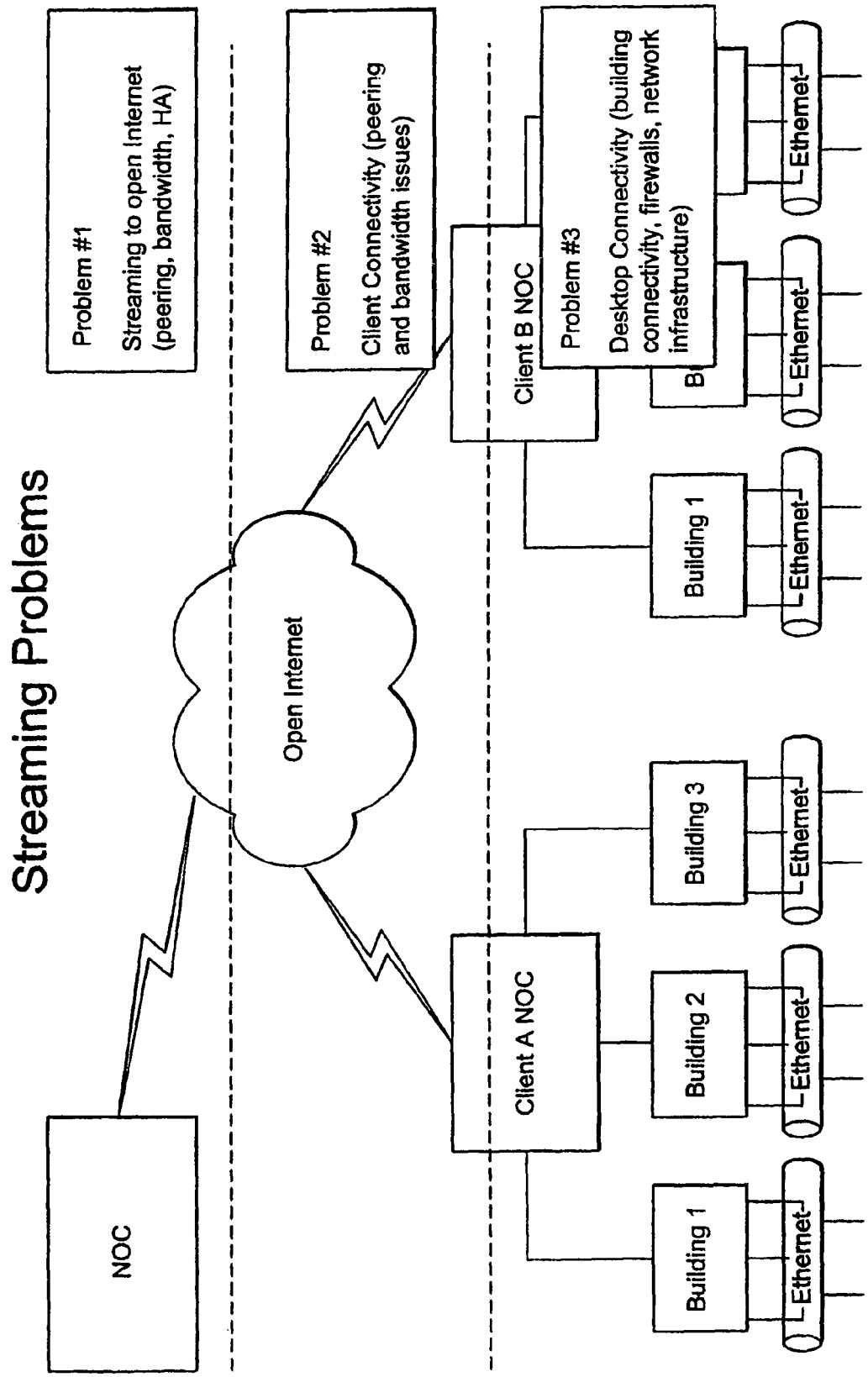
FIG. 3 illustrates problems associated with related art methodologies.

FIG. 3 illustrates some typical problems of the prior art, including bandwidth and connectivity problems. As mentioned above, previous IP video technology required that viewers first download a segment in its entirety before playback could begin. The present invention provides a solution to such problems for data streaming and is described below with reference to several preferred embodiments, and, as described in connection with FIGS. 10-12 below, can extract metadata from a digital media asset management (DMAM) sub-system to drive content delivery.

Figure 10:
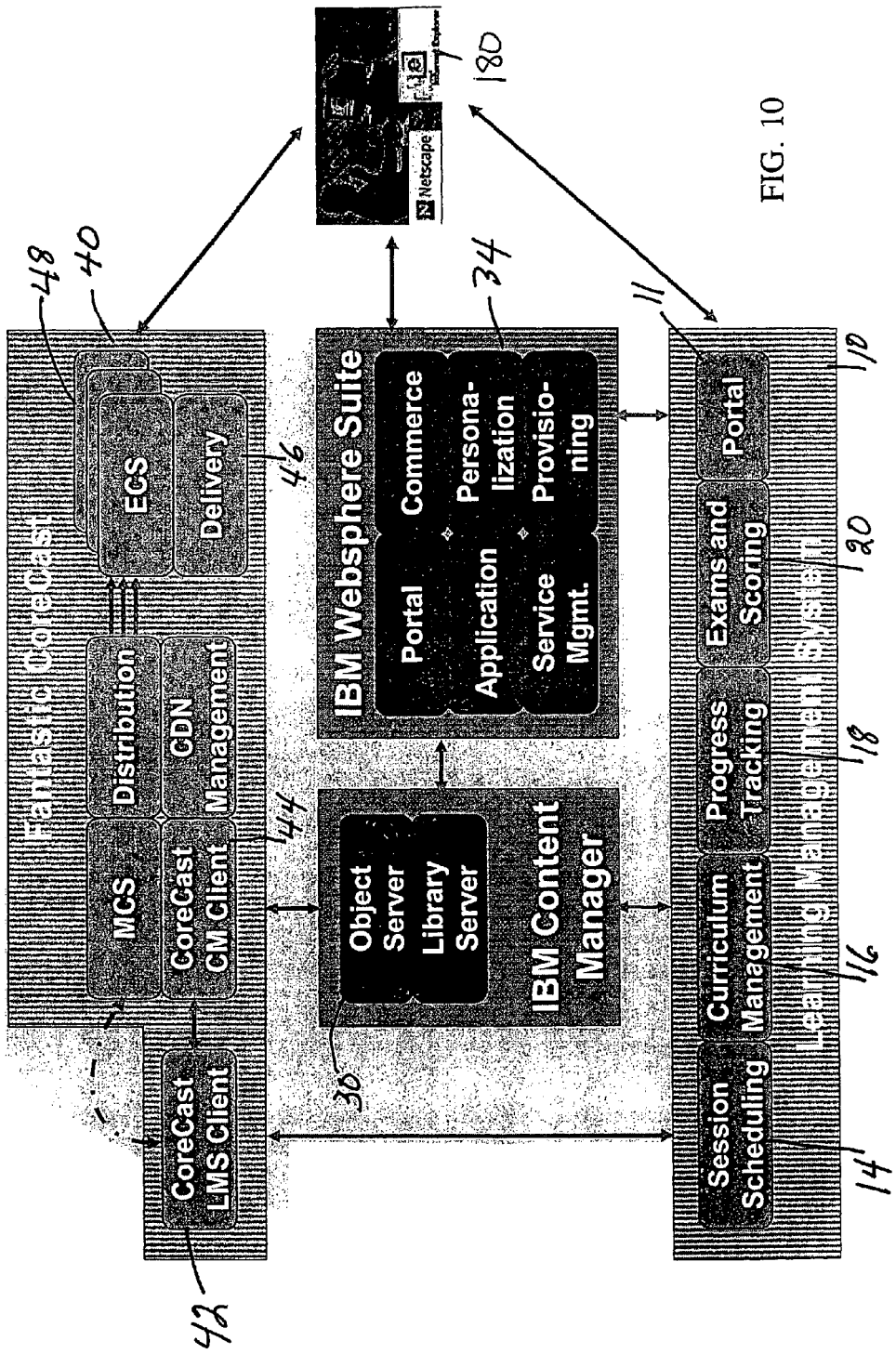
FIG. 10 is a schematic diagram of a learning management system in accordance with a preferred embodiment of invention.

FIG. 10 illustrates schematically an arrangement in which learning lessons of a subject of any type are available and managed at a Learning Management System (LMS) 10 location that has a portal 11 for upload and download via internet connection 12. As illustrated in FIG. 10, the LMS can be used for corporate training such as sales techniques, competitive awareness, policy dissemination and other functions.

The LMS 10 has provision for session scheduling 14, curriculum management 16, progress tracking for the individual student 18, and exams and scoring 20 for the student. The curriculum management section 16 of the LMS is supplied content directly or over the Internet from a content manager 30 that contains the necessary lesson data. The portal 11 of the LMS can be managed by an applicable program 34 such as the IBM Websphere Suite, which also has connection to the Internet 12.

Program distribution to the individual student clients is managed on an overall basis by the module 40 (such as the Corecast™ module made available by the Fantastic Corporation, headquartered in Zug, Switzerland) having a section 42 that communicates with the LMS session scheduling section 14. The data from the content manager 30 can be passed to the module 40.

The module 40 also includes a master control server (MCS) which provides at the NOC a server architecture that performs redirection, content distribution and edge server monitoring. Redirection is preferably performed in accordance with predetermined criteria that is programmed into the MCS. The predetermined criteria can include the presently available bandwidth, the hop count, latency, and router queue depth that are applicable through a given path to the client machine. The redirection is automatically performed to better ensure optimal content transmission to distributed client machines, but is selectively performed, for example, when threshold levels for the predetermined criteria are not satisfied. These criteria are gauged through conventional network performance monitoring software. The MCS can be associated with either the eCDN module 40 or the edge content server 48. As well, the module 40 includes an edge content server (ECS) that runs caching and streaming operations, and which also can perform network analysis via the NDC application.

With further reference to FIG. 10, client computers 20 with a browser application 180 executing thereupon interact with the portal 11 and content access software 34 to access a library of digital media. The content manager 30 interacts with the module 40 to enable the delivery of rich media to geographically diverse clients 20 by linking applications with a distributed network of intelligent servers at the edge of the network. When a user at a client 20 requests content, it is served from the closest edge server, rather than a centralized server that may be in a distant place on the network.

Delivery of the content (e.g., lessen data) is managed by the delivery section 46, which has two way communication with the Internet so that a user (student) can respond. The delivery section 46 includes an edge content server 48, which is shown in greater detail in FIG. 11. This acts to deliver content to individual users (students) on a personalized basis with facility for authentication of each individual user's identity. As described next, the module 40 combines network analysis with caching, streaming, load balancing, and redirection technology to make intelligent decisions for bandwidth management and content routing over enterprise WANs and LANs.

Figure 11:
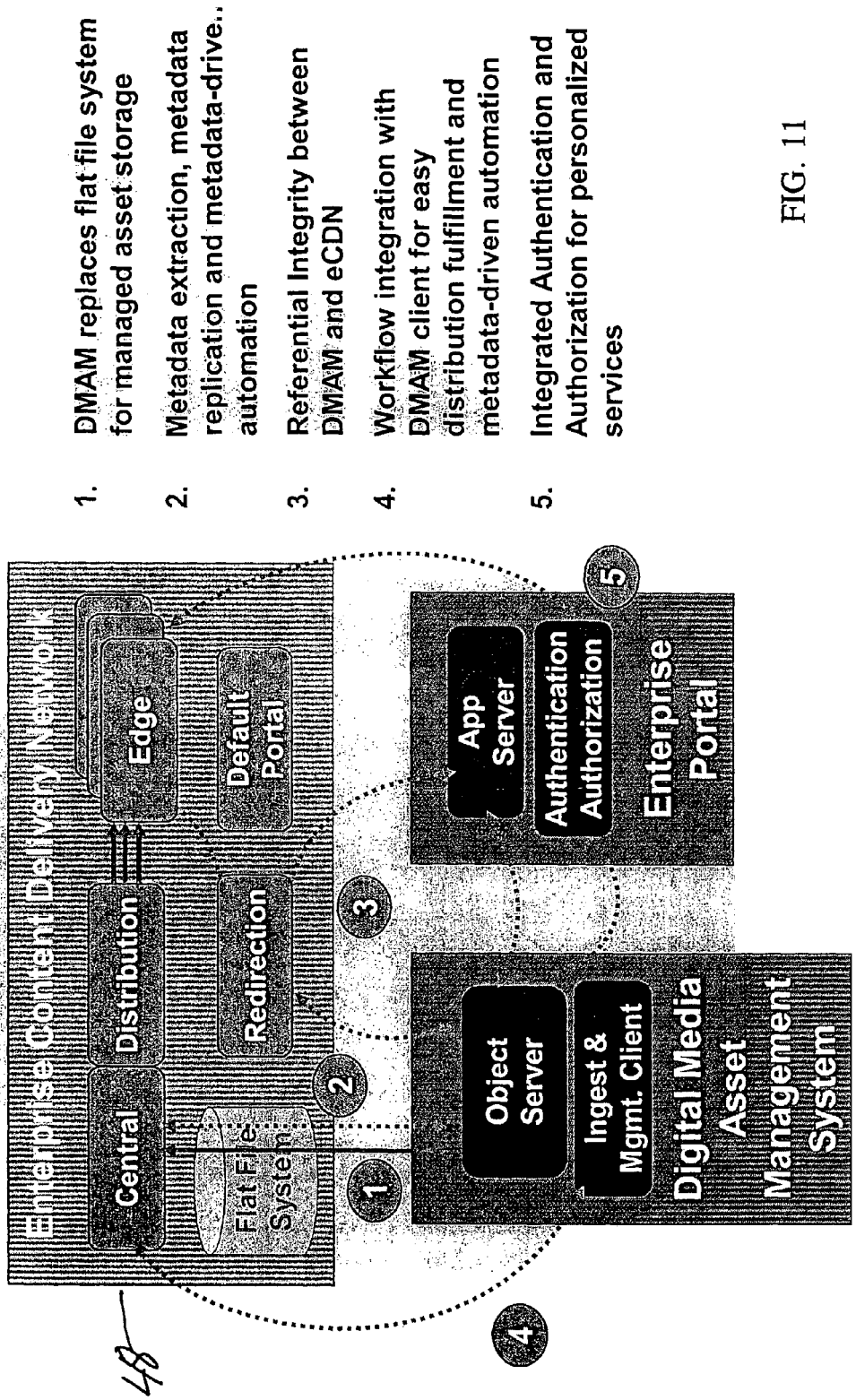
FIG. 11 is a schematic diagram of an integrated digital media asset management system (DMAM) with an enterprise content delivery network (eCDN) in a multi-tiered application of the preferred embodiment of FIG. 10.

Referring now to FIG. 11, the edge content server 48 comprises a back-end application that manages all device, applications, and services on the overlay network on which the module 40 operates. The edge content server replaces conventional flat-file media objects storage with a digital media asset management (DMAM) system. The DMAM serves objects as does a conventional file storage system but also utilizes metadata to permit intelligent content management and distribution. The metadata permits coordination of content distribution and scheduling. See, e.g., U.S. Pat. No. 6,477,707, assigned to the present assignee, for more information on the use of such metadata.

Metadata from the DMAM is extracted in an enterprise content delivery network (eCDN) for distribution to a network edge. The metadata is replicated and utilized to drive automated content distribution. Referential integrity is maintained through continued communications between an enterprise portal, the DMAM and the eCDN, as illustrated by bi-directional arrows denoted "3" in FIG. 11. Workflow integration with the DMAM client provides for ease of distribution fulfillment and metadata-driven automation. The enterprise portal includes authentication authorization which integrates with the network edge for controlled distribution of content.

Figure 12:
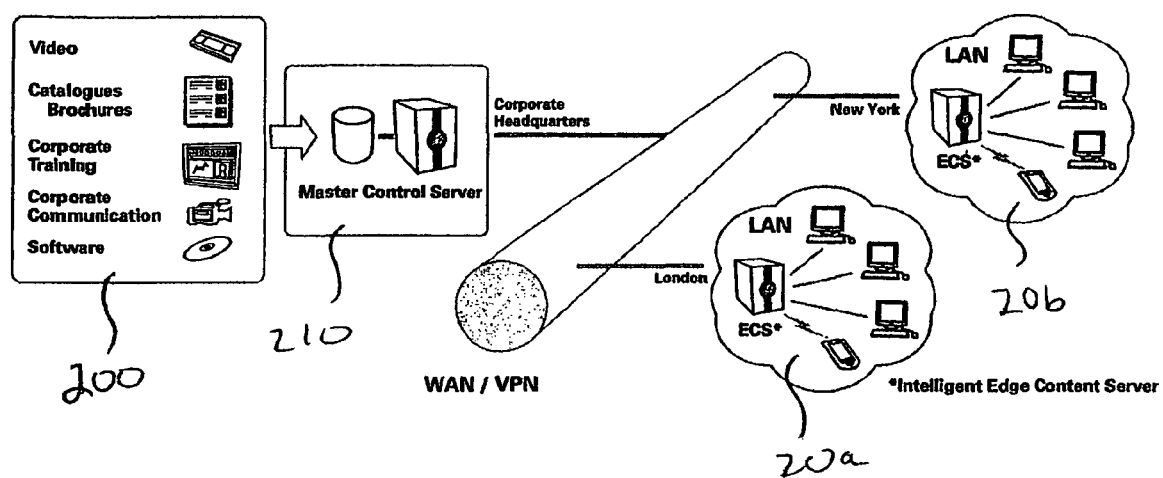
FIG. 12 illustrates a variety of media objects that can be provided to a master control server.

FIG. 12 illustrates a variety of media objects 200 which are provided to a master control server 210 which can be located, for example, at a corporate headquarters or other source location. The media objects are scheduled and distributed across a wide area network or virtual private network, for example, to intelligent edge content servers at various and potentially dispersed client locations 20a, 20b.

In one embodiment, a segment does not need to be downloaded in its entirety before playback can begin due to compression of the data for streaming delivery over varied bandwidth connections (e. g., low-bandwidth connections). Commercially available software such as Real Network Real Video, or Microsoft Windows Media or Apple Quicktime/Sorenson or MPEG codecs may be used for the compression. When compressed, up-to-the-minute information can be deployed to globally dispersed online audiences with quality and performance. End-users can immediately view and interact with streaming video using a computer equipped with minimum capabilities.

Using well-known commercial client/server streaming applications (such as, for example, Real Networks Real Server or Microsoft Windows Media Server or Apple Darwin Quicktime Streaming Server), the method and system described herein can provide quality Internet video broadcasts. In one embodiment, live or pre-recorded analog video feed is captured, edited, and encoded at which point it is uploaded on streaming-enabled servers (NOC). Depending on the scenario, the content is either made available "live" or archived for on-demand viewing.

End users simply access a user interface and log onto the streaming media system with a password and the video is available for interaction. In one embodiment, the video or streaming media, which is embedded in a customized GUI and augmented with other forms of media, is streamed as a continuous file and can be delivered over low bandwidths (28.8K and 56K dial-up modems).

No content need be downloaded to the end user's hard drive. Instead, content resides on distribution servers that are available on the network and is decoded as it is received at the client PC, using a small one-time downloadable or provided plug-in (e. g. Windows Media Player, RealPlayer). Streaming involves no special network requirements and minimum end-user system requirements. Because it is highly scalable, it is greatly enhanced by the multimedia capabilities of more powerful machines operating at higher bandwidths (ISDN, T-1, T-3, ADSL, cable).

Figure 4:
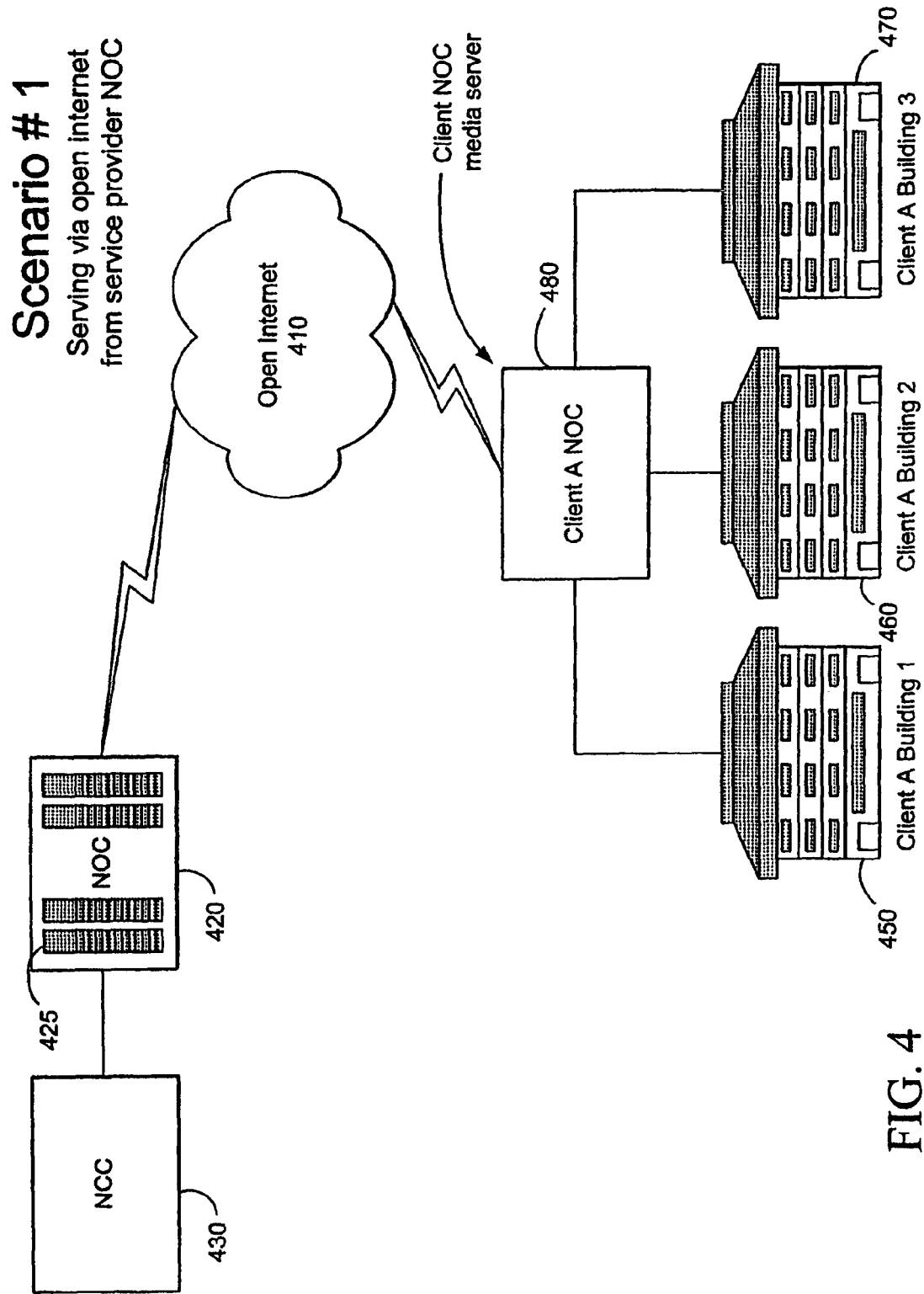
FIG. 4 illustrates an embodiment serving via the open Internet from the service provider's Network Operations Center (NOC).

FIG. 4 illustrates a first scenario for use of the invention involving serving client media via the open, public Internet 410 from servers located in a service provider's private Network Network Operations Center (NOC) 420. Inside the service provider's Network Control Center (NCC) 430, personnel create and publish media files on a staging server, which resides in the service provider's NCC. After the files are created and placed on the staging server, personnel then use a content distribution tool (such as, for example, Interwoven OpenDeploy or Vignette Syndication Server) to categorize the files according to client, and client subgroups (for example, departments, buildings, etc). After categorization is complete, the service provider personnel use the content distribution tool to schedule publishing of the files, be it either immediate or at some future time.

The files are then published (copied) to media servers 425 in the service provider's Operations Center and are then available for viewing at client locations 450-480 via the open, public Internet. Inside the NOC 420, the media servers may be monitored for system health, file system integrity and security from monitoring machines in the service provider's NCC.

Figure 5:
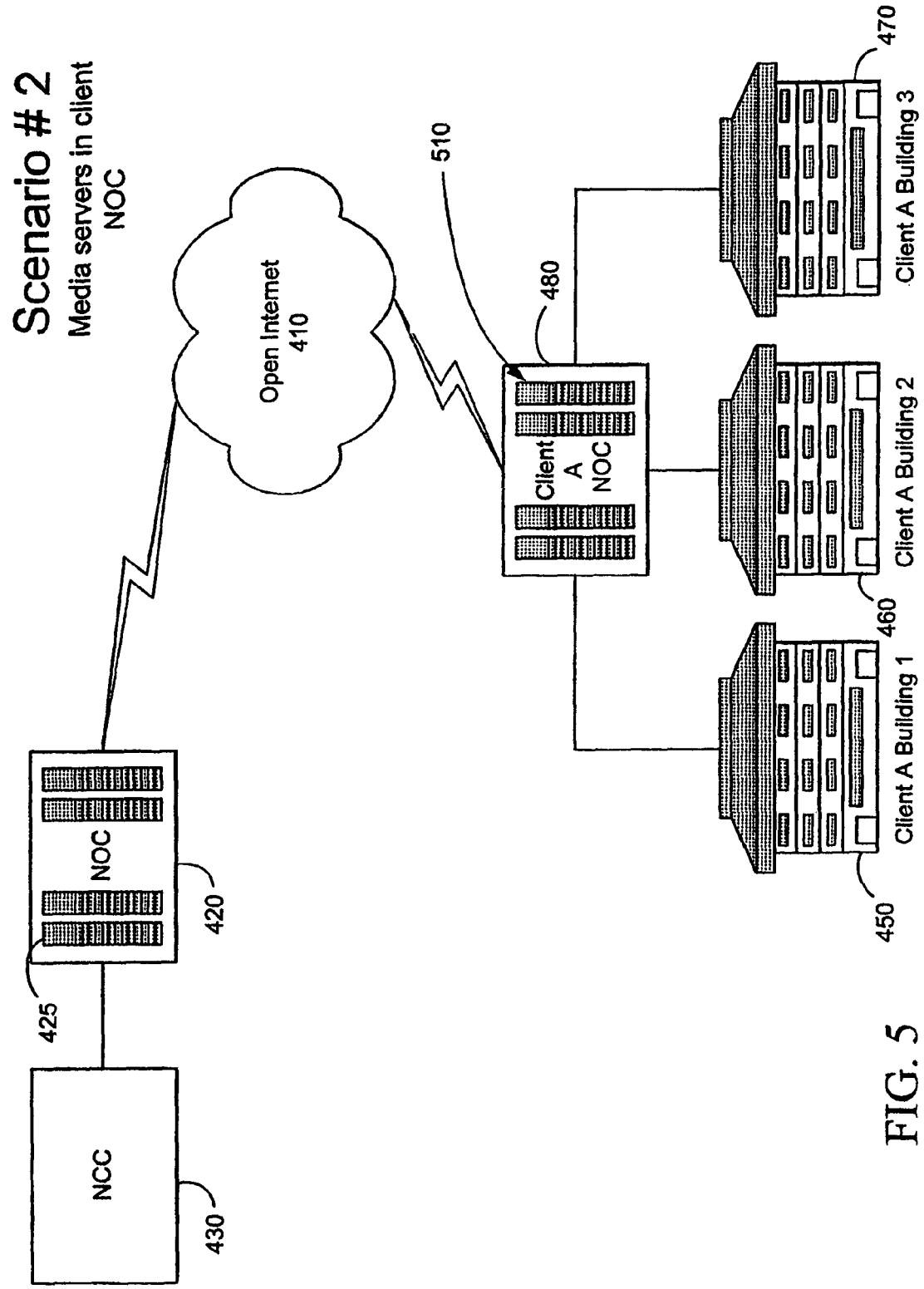
FIG. 5 illustrates an embodiment serving via media servers in the client's NOC.

FIG. 5 illustrate a second scenario for use of the invention involving serving client media from service provider's servers 510 located in the client's Network Operations Center (NOC) 480 to overcome latency and packet-loss problems present when trying to view media files over the open Internet 410.

The media servers 480 are here shown installed in the client's NOC 480 in accordance with the client's security requirements. After installation, the flow of information is fairly similar to the first scenario, above. Inside the service provider's Network Control Center (NCC) 430, service provider personnel create and publish media files on a staging server, which resides in the service provider's NCC. After the files are created and placed on the staging server, personnel then use a standard content distribution tool to categorize the files according to client, and client subgroups (for example, departments, buildings, etc). After categorization is complete, the service provider personnel use the content distribution tool to schedule publishing of the files, be it either immediate or at some future time. The files are then published (copied) to media servers 425 in the service provider's Network Operations Center for any client employees who still need to view the files via the open Internet. In one embodiment, the files are also published to the service provider's servers 510 located in the client NOC 480 and are then available for client viewing directly from the servers in the client's NOC. Inside the client and service provider's respective NOCs, the service provider's servers may be monitored for system health, file system integrity and security from monitoring machines in the service provider's NCC in accordance with the client's established security policy.

Figure 6:
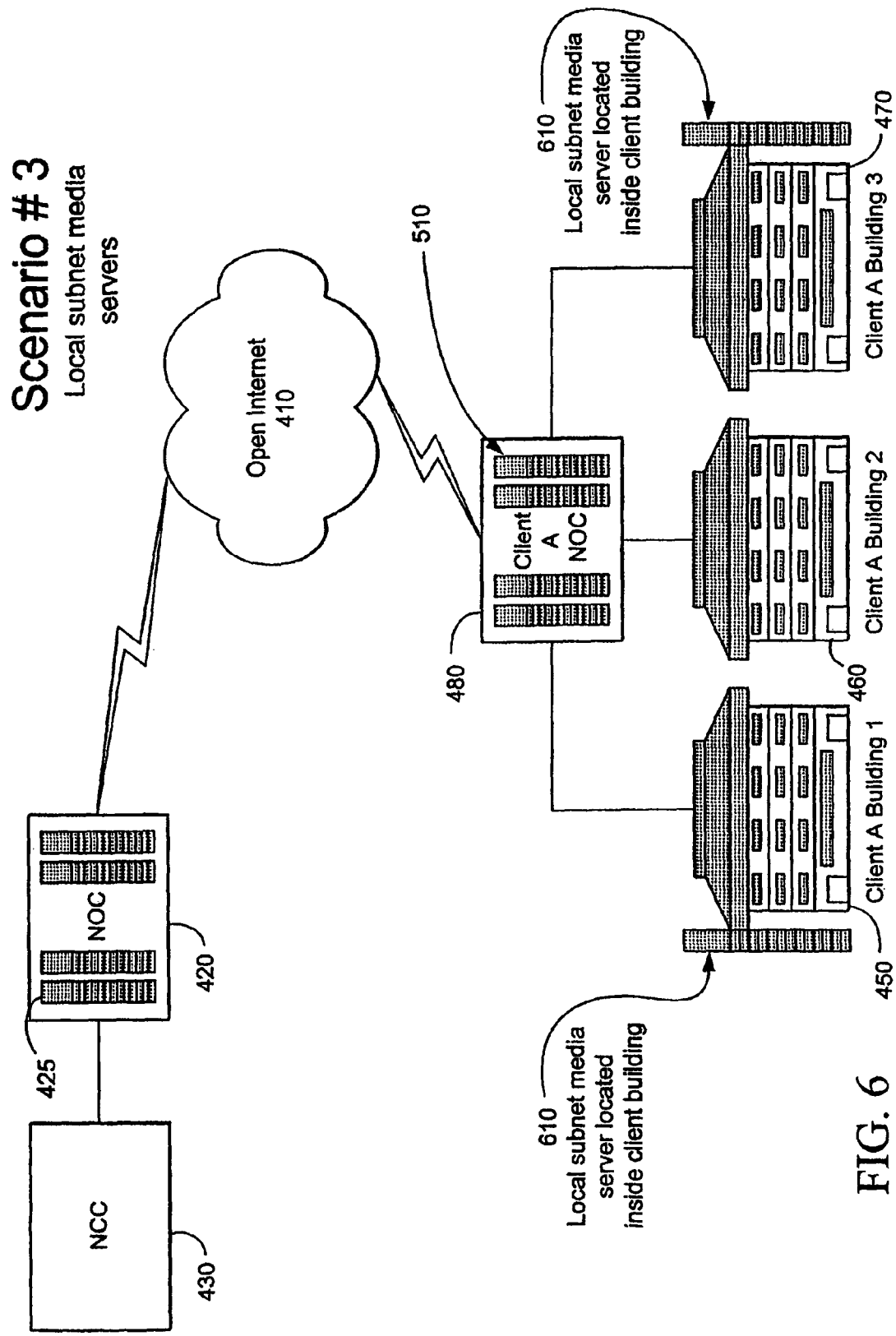
FIG. 6 illustrates an embodiment serving via local sub-net media servers.

FIG. 6 illustrates a third scenario for use of the invention involving serving client media from service provider's servers located in the client's local area networks (LAN) on sub-networks. Under this scenario, the content delivery overcomes latency and packet-loss problems present when trying to view media files over the open, public Internet 410 as well as congested network links inside the client's private network. The servers are installed on the client's LAN in accordance with the client's security requirements. After installation, the flow of information is similar to the second scenario, above, except that in this case the local media servers 610 are placed in the buildings and local sub-nets where end-users are located. Inside the service provider's Network Control Center (NCC), personnel create and publish media files on a staging server residing in the service provider's NCC. After the files are created and placed on the staging server, personnel then use a standard content distribution tool (as exemplified above) to categorize the files according to client, and client subgroups (for example, departments, buildings, etc). After categorization is complete, personnel use the content distribution tool to schedule publishing of the files be it either immediate or at some future time.

The files are then published (copied) to media servers in the service provider's Network Operations Center for any client employees who still need to view the files via the open Internet. The files are also published to the service provider's servers located in the client's NOC, and media servers located on the client's local subnets where the target audience resides. The content is then available for client viewing directly from the servers located closest to the client (be it the servers on their sub-net or the servers in the client's NOC). Inside the client and service provider's NOC and client sub-nets, servers are monitored for system health, file system integrity and security from monitoring machines in the service provider's NCC in accordance with the client's established security policy.

Figure 7:
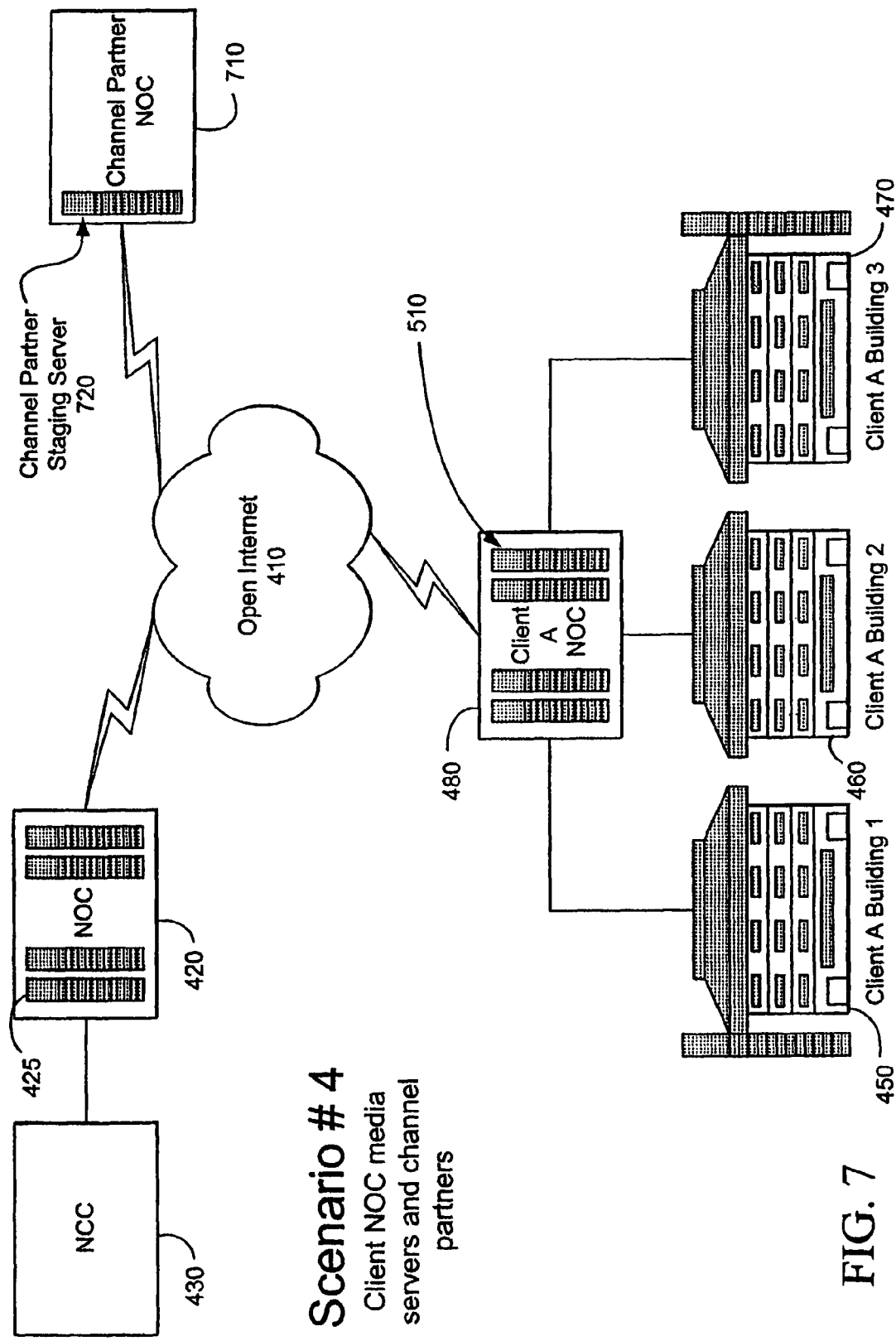
FIG. 7 illustrates an embodiment serving via media servers in the client's NOC and channel partners.

FIG. 7 illustrates a fourth scenario for use of the invention involving serving client media created by channel partners from service provider's servers located in the client's Network Operations Center 480. This overcomes latency and packet-loss problems present when trying to view media files over the open Internet. The servers are installed in the client's NOC in accordance with the client's security requirements. After installation, the flow of information is similar to the second scenario, above, except that in this case the media isn't coming from the service provider or client, but rather from Channel Partners who wish to get their media into the client's networks with good quality of service. Inside the Channel Partner's Network Control Center (NCC) 710, personnel create and publish media files on a staging server, which resides in the Channel Partner's NOC. After the files are created and placed on the staging server 720, personnel then use a standard content distribution tool to categorize the files according to client, and client subgroups (for example, departments, buildings, etc). After categorization is complete, Channel Partner personnel use the content distribution tool to schedule publishing of the files be it either immediate or at some future time. The files are then published (copied) to media servers 425 in the service provider's Network Operations Center 420 for any client employees who still need to view the files via the open Internet. The files are also published to the service provider's servers 510 located in the client NOC 480. The content is then available for client viewing directly from the servers located in the client NOC. Inside the client's and service provider's respective NOCs, the servers may be monitored for system health, file system integrity and security from monitoring machines in the service provider's NCC in accordance with the client's established security policy.

FIG. 8 illustrates a fifth scenario for use of the invention involving serving client media created by channel partners from service provider's servers located in the client's local area networks. (LAN) on sub-nets. In this scenario, the content is to be delivered to overcome latency and packet loss problems that are present when trying to view media files over the open, public Internet as well as congested network links inside the client's private network. The servers are installed on the client's LAN in accordance with the client's security requirements. After installation, the flow of information is similar to the third scenario, above, except that in this case the media isn't coming from the service provider or client, but rather from Channel Partners who wish to get their media into the client's networks with good quality of service. Inside the Channel Partner Network Control Center (NCC), media files are created and published on a staging server, which resides in the Channel Partner's NOC. After the files are created and placed on the staging server, Channel Partner personnel then use a standard content distribution tool (as exemplified above) to categorize the files according to client, and client subgroups (for example, departments, buildings, etc). After categorization is complete, Channel Partner personnel uses the content distribution tool to schedule publishing of the files be it either immediate or at some future time. The files are then published (copied) to media servers in the service provider's Network Operations Center for any client employees who still need to view the files via the open Internet. The files are also published to the service provider's servers located in the client's NOC, and media servers located on the client's local sub-nets where the target audience of end-users resides. The content is then available for client viewing directly from the servers located closest to the client (be it the servers on their sub-net or the servers in the client NOC) Inside the client and service provider's respective NOCs and client sub-nets, servers are monitored for system health, file system integrity and security from monitoring machines in the service provider's NCC in accordance with the client's established security policy.

Figure 9A:
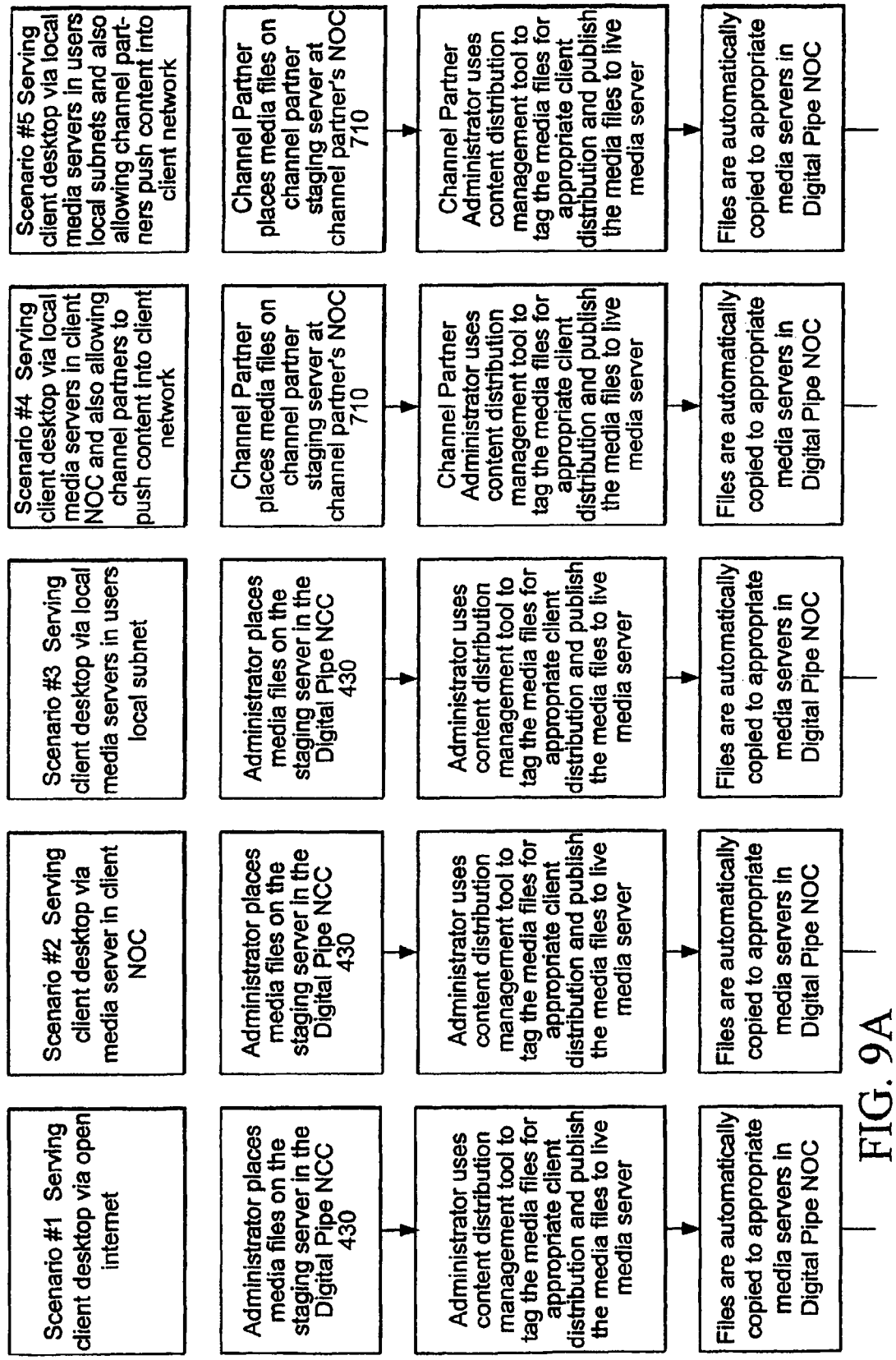
FIGS. 9A and 9B illustrates flow charts for the scenarios of FIGS. 4 through 8.
Figure 9B:
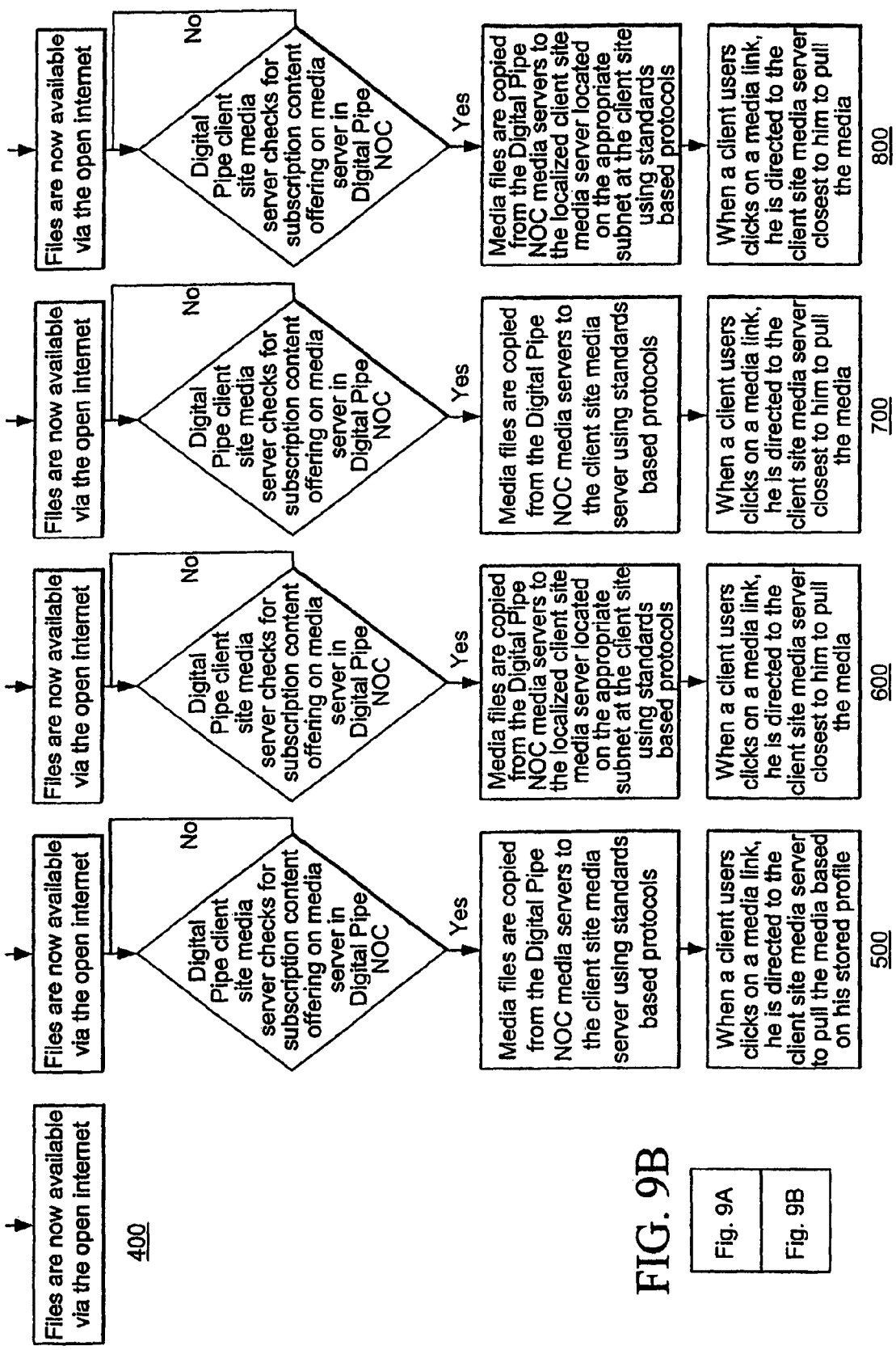

FIGS. 9A and 9B show flow charts 400 through 800 which correspond to the five illustrative embodiments described above in reference to FIGS. 4-8.

The following currently pending applications relate to the present application and are hereby fully incorporated by reference in their entirety: Ser. No. 09/046,901, filed Mar. 24, 1998 entitled "Method and System for Broadcast Transmission of Media Objects," now U.S. Pat. No. 6,477,707; Ser. No. 09/364,761, filed Jul. 30, 1999 entitled "Data Transmission;" Ser. No. 09/385,746, filed Aug. 30, 1999 entitled "System and Method for Automatically Rescheduling A Data Transmission To Members Of A Group;" Ser. No. 60/345,501, filed Oct. 24, 2001 entitled "One Touch Platform;" and Ser. No. 10/062,830 filed Jan. 31, 2002, entitled "Data Packet Timing For Controlled Bandwidth."

The foregoing description of preferred embodiments of the invention has been presented for the purposes of illustration and description. It is not meant to be exhaustive or to limit the invention to the precise forms disclosed since many modifications and variations will be apparent to those skilled in this art. Rather, it is intended that the following claims and their equivalents define the scope of the invention.

I claim:

1. A method, performed by a first computer including a memory and a processor, for providing content over communicatively coupled computer networks, wherein the content is stored for delivery across the communicatively coupled computer networks, the content being stored in association with metadata, the method comprising:
   receiving, by the first computer, a content request from a particular client machine; and
   responsive to receiving the content request,
      utilizing, by the first computer, the metadata to provide at least a first portion of the content to a first network edge server associated with the communicatively coupled computer networks that does not store the first portion of the content, wherein the at least first portion of the content is delivered from the first network edge server to the particular client machine; and
      providing, by the first computer, a second portion of the content to a second network edge server associated with the communicatively coupled computer networks that does not already store the second portion of the content while automatically redirecting by the first computer the particular client machine to the second network edge server in real-time in accordance with predetermined criteria, wherein the second portion of the content is delivered from the second network edge server to the particular client machine.

2. The method of claim 1, wherein the first network edge server is disposed proximate to the particular client machine and the second network edge server is less proximate to the particular client machine.

3. The method of claim 2, wherein the first network edge server is geographically proximate to the particular client machine.

4. The method of claim 2, wherein the first network edge server is temporally proximate to the particular client machine.

5. The method of claim 1, wherein the predetermined criteria is available bandwidth, hop count, latency, or router queue depth.

6. The method of claim 1, wherein the particular client machine is automatically redirected to the second network edge server based on the performance of a network branch that includes the first network edge server.

7. A computer system for providing content over communicatively coupled computer networks, wherein the content is stored for delivery across the communicatively coupled computer networks, the content being stored in association with metadata, the computing system comprising:
   one or more processors;
   a portal to an enterprise computer network, the enterprise computer network being configured to deliver the stored content to a plurality of distributed client machines via one or more designated network edge servers, the portal being configured to receive a content request from a particular machine;
   a component configured to, in response to receiving the content request, use at least one of the processors to use the metadata to provide at least a first portion of the content to a first network edge server associated with the communicatively coupled computer networks that does not store the first portion of the content; and
   a component configured to use at least one of the processors to selectively provide one of the first portion and a second portion of the content to a second network edge server that does not already store the second portion of the content while automatically redirecting the particular client machine to the second network edge server in real-time in accordance with a predetermined criterion, wherein the selectively provided portion of the content is delivered from the second network edge server to the particular machine.

8. The computing system of claim 7, further comprising:
   a component configured to select the second network edge server so that the second network edge server is closer to the particular client machine than the first network edge server.

9. The computing system of claim 7, wherein the predetermined criterion is based on the performance of a network branch that includes the first network edge server.

10. The computing system of claim 7, wherein the predetermined criterion is available bandwidth, hop count, latency, or router queue depth of a network branch that includes the first network edge server.

11. The computing system of claim 7, wherein the predetermined criterion is based on the performance of a network branch that includes the second network edge server.

12. The computing system of claim 11, wherein the predetermined criterion is available bandwidth, hop count, latency, or router queue depth of the network branch that includes the second network edge server.

13. A computer-readable storage device having instructions stored thereon, the instructions comprising:
   instructions for receiving at a device a content request from a particular client machine;
   instructions for, responsive to receiving the content request, utilizing at the device the metadata to provide at least a first portion of the content to a first network edge server that does not store the first portion of the content for delivery to the particular client machine, wherein the at least first portion of the content is delivered from the first network edge server to the particular client machine; and
   instructions for providing, by the device, a second portion of the content to a second network edge server that does not already store the second portion of the content, for delivery to the particular client machine from the second network edge server while automatically redirecting, by the device, the particular client machine to the second edge server in real-time in accordance with a predetermined criteria.

14. The computer-readable storage device of claim 13, wherein the instructions further comprise:
   instructions for selecting the second network edge server so that the second network edge server is closer to the particular client machine than the first network edge server.

15. The computer-readable storage device of claim 14, wherein the instructions further comprise:
   instructions for selecting the first network edge server based on a geographic proximity of the first network edge server to the particular client machine wherein the instructions for selecting the second network edge server include instructions for selecting the second network edge server based on a geographic proximity of the second network edge server to the particular client machine.

16. The computer-readable storage device of claim 13, wherein the instructions further comprise:
   instructions for providing the first portion of the content to the second network edge server.

17. The computer-readable storage device of claim 13, wherein the instructions for automatically redirecting the particular client machine to the second network edge server include instructions for automatically redirecting the particular client machine based on the performance of a network branch that includes the first network edge server.

18. The computer-readable storage device of claim 17, wherein the instructions for automatically redirecting the particular client machine to the second network edge server include instructions for automatically redirecting the particular client machine based on available bandwidth, hop count, latency, or router queue depth of the network branch that includes the first network edge server.

19. The computer-readable storage device of claim 13, wherein the instructions for automatically redirecting the particular client machine to the second network edge server include instructions for automatically redirecting the particular client machine based on the performance of a network branch that includes the second network edge server.

20. The computer-readable storage device of claim 19, wherein the instructions for automatically redirecting the particular client machine to the second network edge server include instructions for automatically redirecting the particular client machine based on available bandwidth, hop count, latency, or router queue depth of the network branch that includes the second network edge server.

\* \* \* \* \*

UNITED STATES PATENT AND TRADEMARK OFFICE
CERTIFICATE OF CORRECTION

PATENT NO. : 8,086,750 B2  Page 1 of 1
APPLICATION NO. : 11/029212
DATED : December 27, 2011
INVENTOR(S) : Voegel It is certified that error appears in the above-identified patent and that said Letters Patent is hereby corrected as shown below:

In Fig. 11, Sheet 12 of 13, for Point "2.", in Line 2, delete " -drive.. " and insert -- -driven --, therefor.

In Column 3, Line 14, delete "(eCDN)" and insert -- (eCDNs) --, therefor.

In Column 5, Line 3, delete "(ROMS)" and insert -- (ROMs) --, therefor.

In Column 8, Line 41, delete "Network Operations" and insert -- Operations --, therefor.

In Column 12, Line 4, in Claim 7, delete "particular" and insert -- particular client --, therefor.

In Column 12, Line 21, in Claim 7, delete "particular" and insert -- particular client --, therefor.

Signed and Sealed this
Twenty-sixth Day of June, 2012

David J. Kappos
*Director of the United States Patent and Trademark Office*